(12) United States Patent
Garcia

(10) Patent No.: US 11,949,184 B1
(45) Date of Patent: Apr. 2, 2024

(54) CONFIGURABLE ELECTRICAL JUNCTION

(71) Applicant: Manuel Jose Garcia, Las Vegas, NV (US)

(72) Inventor: Manuel Jose Garcia, Las Vegas, NV (US)

( * ) Notice: Subject to any disclaimer, the term of this patent is extended or adjusted under 35 U.S.C. 154(b) by 392 days.

(21) Appl. No.: 17/389,186

(22) Filed: Jul. 29, 2021

(51) Int. Cl.
| | | |
|---|---|---|
| *H01R 13/518* | (2006.01) | |
| *H01R 13/74* | (2006.01) | |
| *H02G 1/00* | (2006.01) | |
| *H02G 3/08* | (2006.01) | |
| *H02G 3/12* | (2006.01) | |

(52) U.S. Cl.
CPC .......... *H01R 13/518* (2013.01); *H01R 13/74* (2013.01); *H02G 1/00* (2013.01); *H02G 3/081* (2013.01); *H02G 3/12* (2013.01)

(58) Field of Classification Search
CPC ........ H01R 13/518; H01R 13/74; H01R 1/00; H01R 3/081; H01R 3/12
USPC ......................................... 439/564, 565, 535
See application file for complete search history.

(56) References Cited

U.S. PATENT DOCUMENTS 9,865,971 B2 * 1/2018 Garcia ................... H01R 13/74

* cited by examiner

*Primary Examiner* — Phuong K Dinh
(74) *Attorney, Agent, or Firm* — Lewis Roca Rothgerber Christie LLP

(57) ABSTRACT

An electrical junction assembly for implementation in a wall that is reconfigurable to accept various types of electrical connectors. Flanges and clips in the electrical junction assembly help self-mount it in a wall. The electrical junction assembly is created from modular receptacles, with each customizable for the type of electrical connection it will accommodate. Keystones are selectively implemented or removed from preconfigured sockets in the receptacles. The receptacles are modular as they may be customized, and then reconfigured as desired, for the number of receptacles and electrical connections they may accommodate.

16 Claims, 8 Drawing Sheets

CONFIGURABLE ELECTRICAL JUNCTION

FIELD OF THE INVENTION

The present invention relates to electrical junctions, and, more particularly, to low voltage receptacles in an electrical junction that is reconfigurable.

BACKGROUND

Junctions for electrical and electronic wiring or connections are known in the art. They are used for connecting audio, video, power devices, etc, to each other or to other equipment. Such equipment include devices such as televisions, stereos, modems, routers, gaming consoles, to name a few. Such equipment usually require cables and connectors to transmit electrical signals to each other. The transmissions of such electrical signals is usually done through walls in an effort to hide the cabling for improved aesthetics.

Junction boxes are often provided for connections to the cables that run inside walls. The junction boxes may mount flush with a wall and serve to provide secure connections for incoming and outgoing cables. Such cables include, for example HDMI, optical, CAT 5, ethernet, DC/AC power, USB, bespoke, etc.

U.S. Pat. No. 9,865,971 discloses an electrical receptacle assembly that has flanges to engage one side of a wall, and a rotatable clip to engage the other side of the wall. The electrical receptacle assembly comprises a plurality of electrical conduits. The electrical conduits comprise different connector-types, which are attached to each receptacle. The total assembly may thus comprise a variety of receptacles with various connector types, all in one single electrical receptacle. Thus, the receptacle assembly can be modified by changing the electrical receptacle assembly in order to provide additional receptacles without installing additional electrical receptacle boxes. This helps prevent damage to the wall that is typically associated with such installations.

In such apparatus, usually the entire electrical receptacle assembly must be replaced with a new one, whether bigger or smaller, to accommodate a modification. Such process is cost inefficient, and may require alterations to the wall in order to accommodate the new electrical receptacle assembly. Ideally it would be preferable to have a modular electrical receptacle assembly whereby electrical conduits may be added or removed with relative ease, and such change will not require changes to the other electrical conduits or the implementation of those conduits in the wall. Accordingly, there is a need for an improved electrical receptacle assembly that is modular whereby electrical conduits may be added or removed with relative ease. Further, preferably, where such change will not require changes to the other electrical conduits or the implementation of those conduits in the wall.

The various aspects of the present invention and the current disclosure were developed in consideration of such need.

SUMMARY OF THE INVENTION

An improvement over known electrical receptacles comprises making parts of the novel receptacle removable without having to dismantle the receptacle or reconfigure the wall.

The novel electrical receptacle can be inserted recessed in a wall. The electrical receptacle comprises cutouts that can accept various different types of electrical jacks. Individual receptacles do not require to be changed to accommodate a new desired electrical connector that is of a different type. Instead, only the jack type needs to be changed, while the receptacle remains in situ.

An electrical junction assembly for a wall comprises a plurality of abutting junction sub-assemblies. Each sub-assembly comprises an electrical connection surface and cooperating connectors located at abutting edges of the electrical sub-assemblies for connecting one sub-assembly to another. The connection surfaces have electrical jack sockets for accommodating electrical jacks.

In an alternate embodiment, an electrical junction box for a wall comprises wall-engaging flanges and an electrical connection surface recessed therefrom, wherein the connection surface has electrical jack sockets for removably connecting electrical jacks.

In another alternate embodiment, an electrical junction comprising a plurality of junction sub-assemblies is installed in a wall. Each sub-assembly has an electrical connection surface with jack sockets. The sub-assemblies are secured to a recess in the wall. The electrical sub-assemblies comprise cooperating connectors located at the edges of the electrical sub-assemblies for connecting one sub-assembly to another. Such serially connected sub-assemblies create an electrical junction assembly. A variety of electrical jacks may be connected to the jack sockets. Corresponding electrical connectors may be connected to the electrical jacks.

These and other novel aspects of the present invention, together with other aspects thereof, can be better understood by the detailed description below, which is designed to be read in conjunction with the accompanying drawings.

COPYRIGHT NOTICE

© 2021 Manuel Garcia. The disclosure in this patent document includes material that is subject to copyright protection. The copyright owner consents to fair use by facsimile reproduction of the patent document or of the patent disclosure as it appears in the U.S. Patent and Trademark Office's records. Other from that, all copyright rights to the disclosure herein are expressly reserved. 37 CFR § 1.71(d).

BRIEF DESCRIPTION OF THE DRAWINGS

The invention can be better understood with reference to the figures. In these figures, like reference numerals designate corresponding parts throughout the different figures and views.

DETAILED DESCRIPTION

The systems, methods, and apparatus of the present invention are described below with reference to the figures. The description and figures are for illustrative purposes only, they do not limit the true scope and spirit of the present invention. The true scope and spirit of the present invention is evidenced by all parts of the disclosure herein, including but not limited to the Summary, the Figures, the Detailed Description, the Claims, and the Abstract, along with equivalents thereof.

Figure 1:
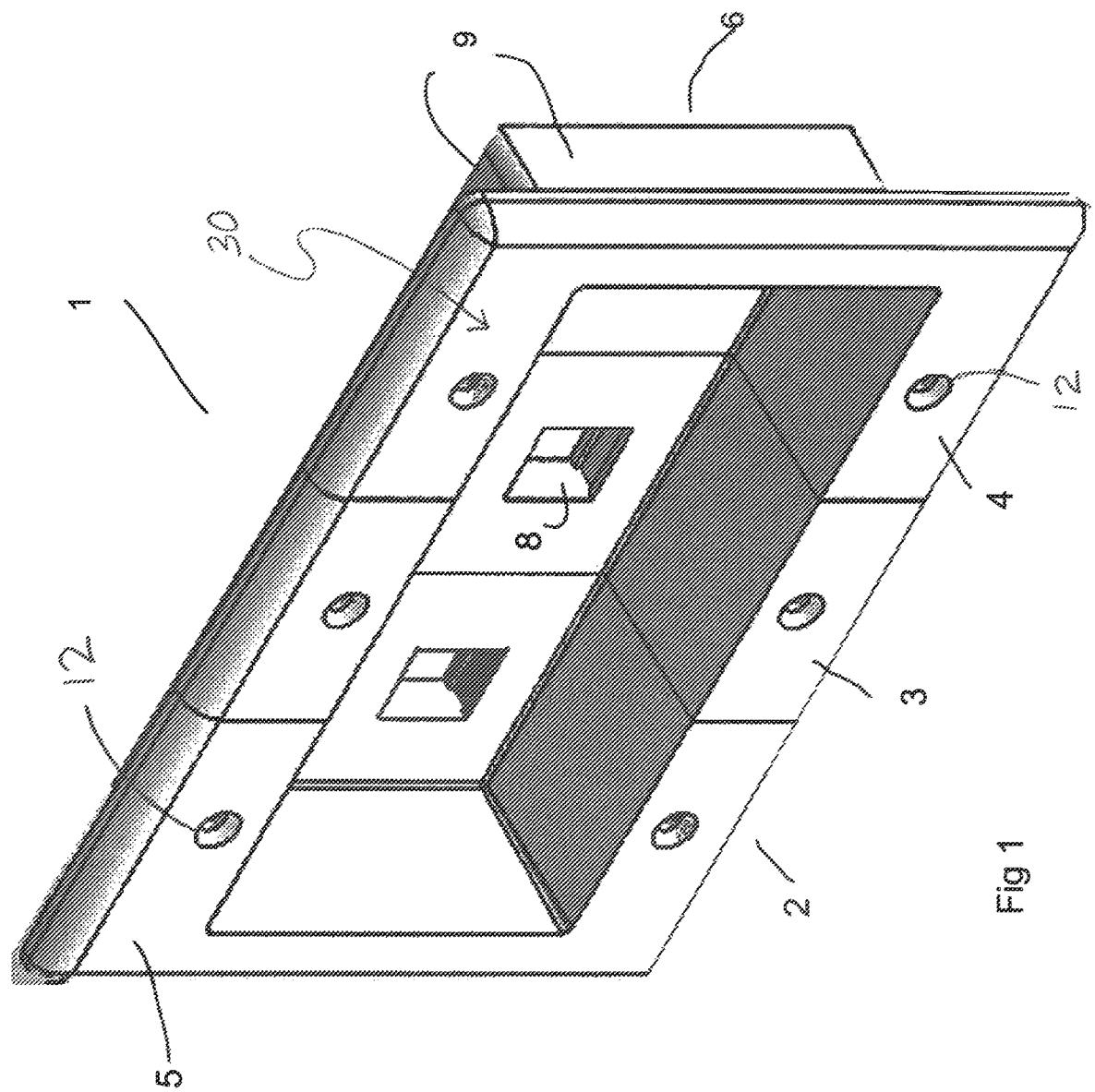
FIG. 1 shows a perspective view of an electrical junction with three receptacles according to one embodiment of the present invention.

FIG. 1 shows a perspective view of an electrical junction 1 according to one embodiment of the present invention. Electrical junction 1 has three receptacles 2, 3, 4. The three receptacles 2, 3, 4 are independent of each other. In one embodiment, receptacles 2, 3, 4 are provided together as a kit. In an alternate embodiment, the receptacles 2, 3, 4 are each provided separately or individually.

In FIG. 1, the three receptacles 2, 3, 4 are assembled together to form one electrical junction 1. As discussed in more detail below, the receptacles 2, 3, 4 may be assembled together at any time, such as at the time of the installation of electrical junction 1. Alternatively, they can be implemented individually in electrical junction 1 for modifying a preexisting configuration of electrical junction 1. In this regard, one or more receptacles 2,3,4 may be removed from electrical junction 1, or one or more receptacles 2, 3, 4 may be added to electrical junction 1.

Each receptacle 2, 3, 4 includes a flange 5. Preferably, each receptacle 2, 3, 4 includes a flange 5 on each of its upper end and its lower end. Flange 5 is designed to help engage and mount electrical junction 1 to a wall. A rear surface 6 of each receptacle 2, 3, 4 is preferably recessed from a front surface 30 of the respective receptacle 2, 3, 4. In one embodiment, rear surface 6 is recessed at least 1 cm from the front surface 30. In an alternate embodiment, rear surface 6 is recessed at least 2 cm from the front surface 30, which will help accommodate a cable head recessed within the wall when electrical junction 1 is installed. That will help prevent damage to the cable head, better secure the electrical connection, and allow items to be placed against the wall.

Rear surface 6 in each receptacle 2, 3, 4 provides at least one socket 8. Socket 8 is an opening in rear surface 6, that is designed to receive and accommodate a keystone. Sockets 8 may be constructed integrally with the receptacle 2, 3, 4, or they may be made separately and connected to the receptacle 2, 3, 4.

A keystone 25 typically comprises an electrical jack. Sockets 8 each have the same design and dimensions, whereby each can receive and accommodate the same keystones 25. Keystones 25 are preferably implemented in a socket 8 whereby they are removably secured in the respective socket 8. Removably securing a keystone 25 in a socket 8 may be accomplished in any of a number of ways, such as by sliding the keystone 25 in the socket 8 and frictionally holding the keystone 25 in place with respect to the corresponding receptacle 2, 3, 4, having a flexible tab that clicks in place to secure the keystone 25 in the socket 8, or the like. Such means are known in the art.

Figure 8:
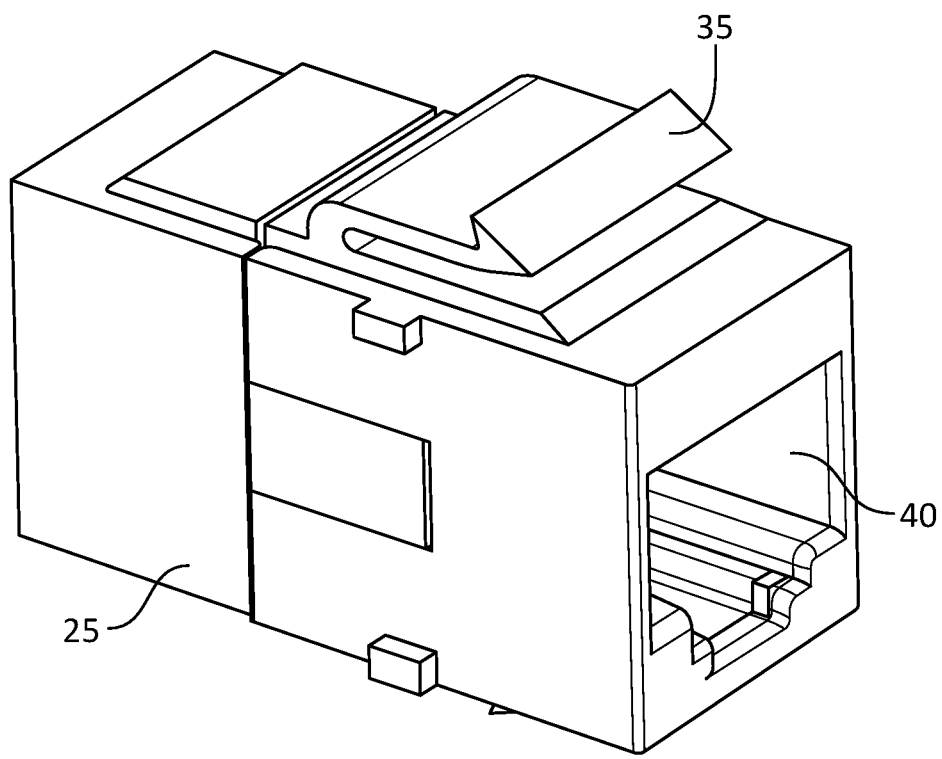
FIG. 8 shows a perspective view of a keystone usable in the electrical junction of FIG. 1.

In such configuration, one skilled in the art will appreciate that different keystones 25 designed to work with different types of electrical jacks can be implemented in the different sockets 8, provided that each keystone's 25 design and dimensions correspond to sockets 8. The electrical junction's 1 receptacles can therefore remain unchanged while only the keystones 25 can be switched out to work with different types of connectors. For example, each different keystone 25 can help accommodate a particular type of data connection, a particular type of signal connection, a power connection, or the like, all in the same socket 8, simply by switching out and implementing the desired keystone 25. Some examples of electrical connections that can be accomplished via keystone 25 include an ethernet connector, an HDMI connection, a coaxial cable connection, an AUX jack, an a/v jack, a USB connection, an electrical power outlet, and the like. Keystones 25 may be provided in a kit or separately. Keystones 25 are usually standard use in the industry, an example is shown in FIG. 8.

In electrical junction 1, receptacle 2 is a left receptacle. Left receptacle 2 abuts receptacle 3, which is a center receptacle. Center receptacle 3, in turn, abuts receptacle 4, which is a right receptacle. As is evident from this configuration, there may be any number of center receptacles 3 abutting each other, which, together, are flanked by left receptacle 2 on the left side and by right receptacle 4 on the right side. Left receptacle 2 and right receptacle 4 may be called end receptacles. An alternate embodiment of electrical junction 1 may even have no center receptacles 3, whereby electrical junction 1 will only comprise left receptacle 2 and right receptacle 4 abutting each other.

In a preferred embodiment, the abutting edges of receptacles 2, 3, 4 each comprise interconnecting means that interconnect to cooperatively engage with corresponding cooperative engagement means in an adjoining receptacle 2, 3, 4. Many types of apparatus and methods for accomplishing such cooperative engagement between two components are known in the art, and it is anticipated that any such means may be implemented in the present invention while conforming with the spirit or scope of the present invention. In one embodiment, the cooperative engagement means comprises one or more protrusions 7 that protrude from an edge 32 of a receptacle 2, 3, 4. The protrusions 7 insert into corresponding recesses 13 on an abutting edge of an adjoining receptacle 2, 3, 4. Such cooperative engagement between two adjoining receptacles 2, 3, 4 provides improved strength for electronic junction 1 and helps stabilize the positioning of the various receptacles 2, 3, 4 that are implemented in an electrical junction 1. It also helps prevent deflection when individual receptacles 2, 3, 4 are changed and wires are implemented in the keystones 25.

Figure 4A:
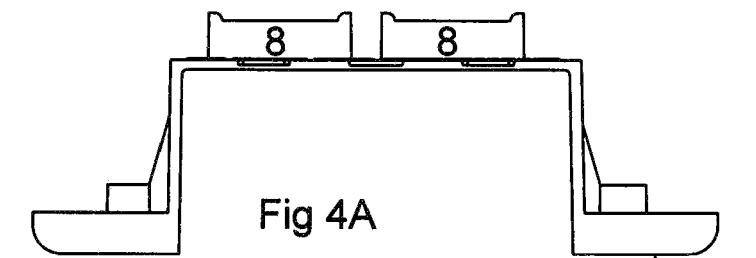
FIG. 4A shows a side view of a center receptacle in the electrical junction of FIG. 1.
Figure 4B:
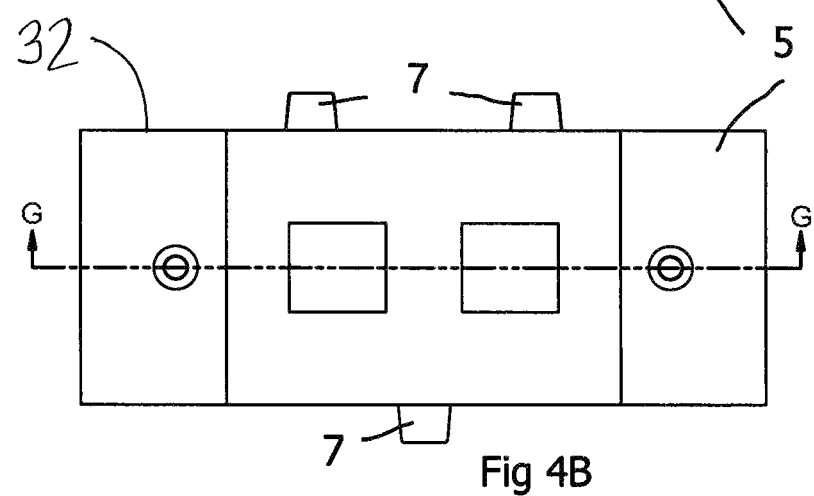
FIG. 4B shows a plan view of the center receptacle of FIG. 4A.
Figure 4C:
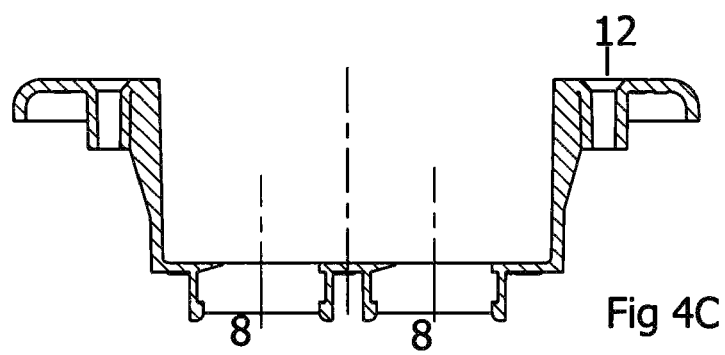
FIG. 4C shows a sectioned view of the center receptacle of FIG. 4A.
Figure 4D:
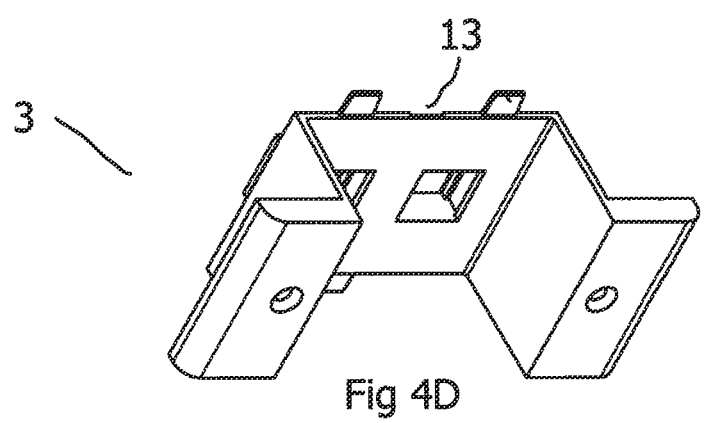
FIG. 4D shows s a perspective view of the center receptacle of FIG. 4A.
Figure 5A:
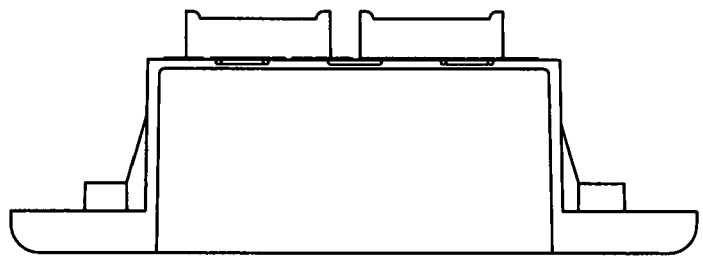
FIG. 5A shows a side view of a left receptacle in the electrical junction of FIG. 1.
Figure 5B:
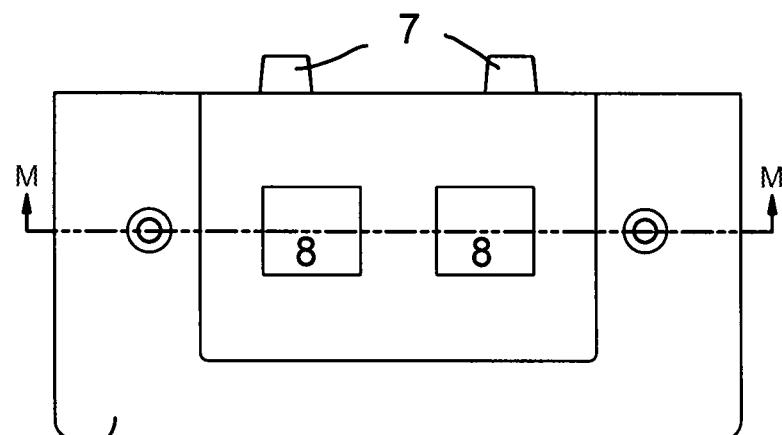
FIG. 5B shows a plan view of the left receptacle of FIG. 5A.
Figure 5C:
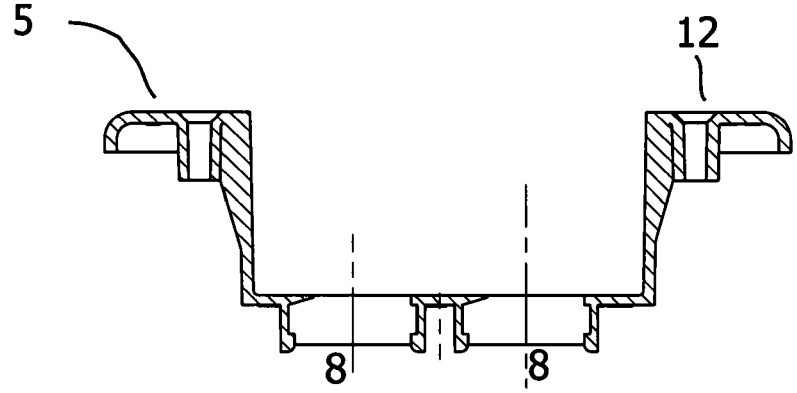
FIG. 5C shows a sectioned view of the left receptacle of FIG. 5A.
Figure 5D:
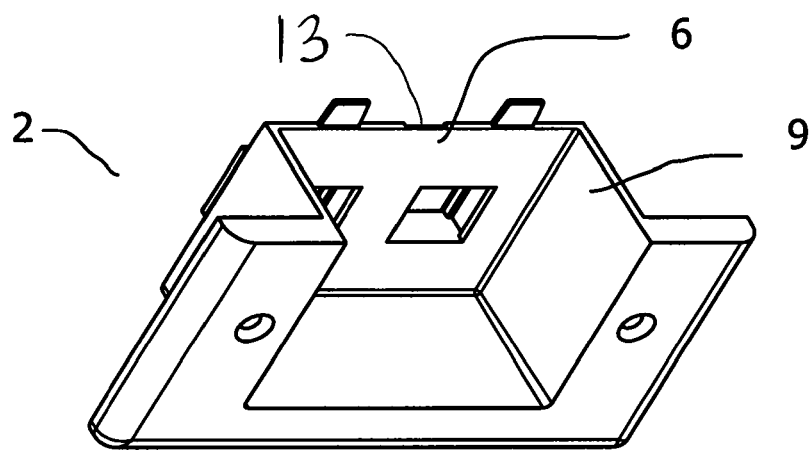
FIG. 5D shows a perspective view of the left receptacle of FIG. 5A.
Figure 6A:
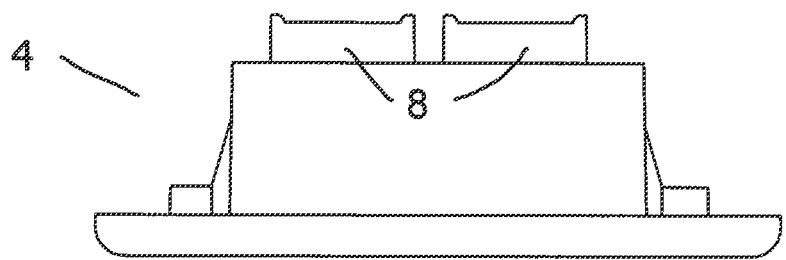
FIG. 6A shows a side view of a right receptacle in the electrical junction of FIG. 1.
Figure 6B:
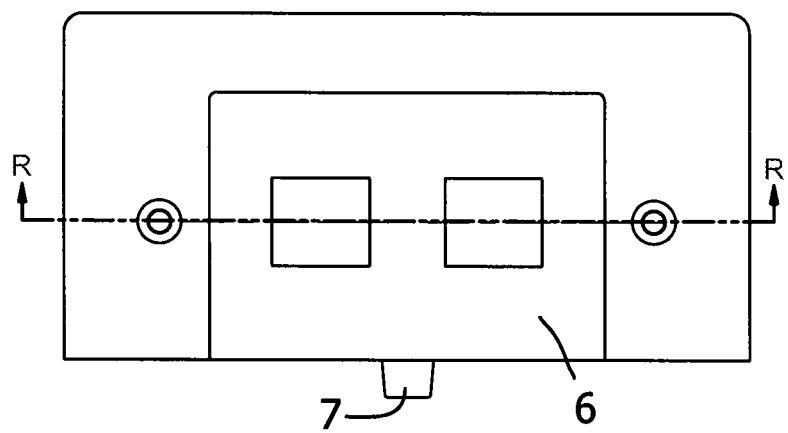
FIG. 6B shows a plan view of the right receptacle of FIG. 6A.

Referring to FIGS. 4B, 5B, and 6B, protruding member 7 may be a pin, a tab, a dovetail, a detent, or the like, which protrudes from the abutting edge 32 to cooperatively engage with a corresponding recess 13. Each abutting edge 32 comprises at least one protruding member 7, or preferably two or more protruding members 7, with corresponding recesses 13 at the abutting edge of the adjoining receptacle. As shown in FIGS. 4, 5, and 6, receptacles 2, 3, 4 have corresponding interconnecting members on the edges 32 of abutting receptacles 2, 3, 4. One receptacle 2, 3, 4 will have a protruding member 7 at a specific position along one edge in order to mate with a corresponding recess 13 in a corresponding abutting edge of an adjoining receptacle 2, 3, 4.

The cooperating protruding members 7 and recesses 13 correspond to each other in size, and may engage in any manner known in the art, such as by an interference fit. While protruding members 7 and recesses 13 are provided as exemplary interconnection means for adjoining receptacles 2, 3, 4, other interconnecting means will occur to those skilled in the art, such as dovetails, pins, or snap fit, which may be used in alternate embodiments of the present invention.

Figure 2:
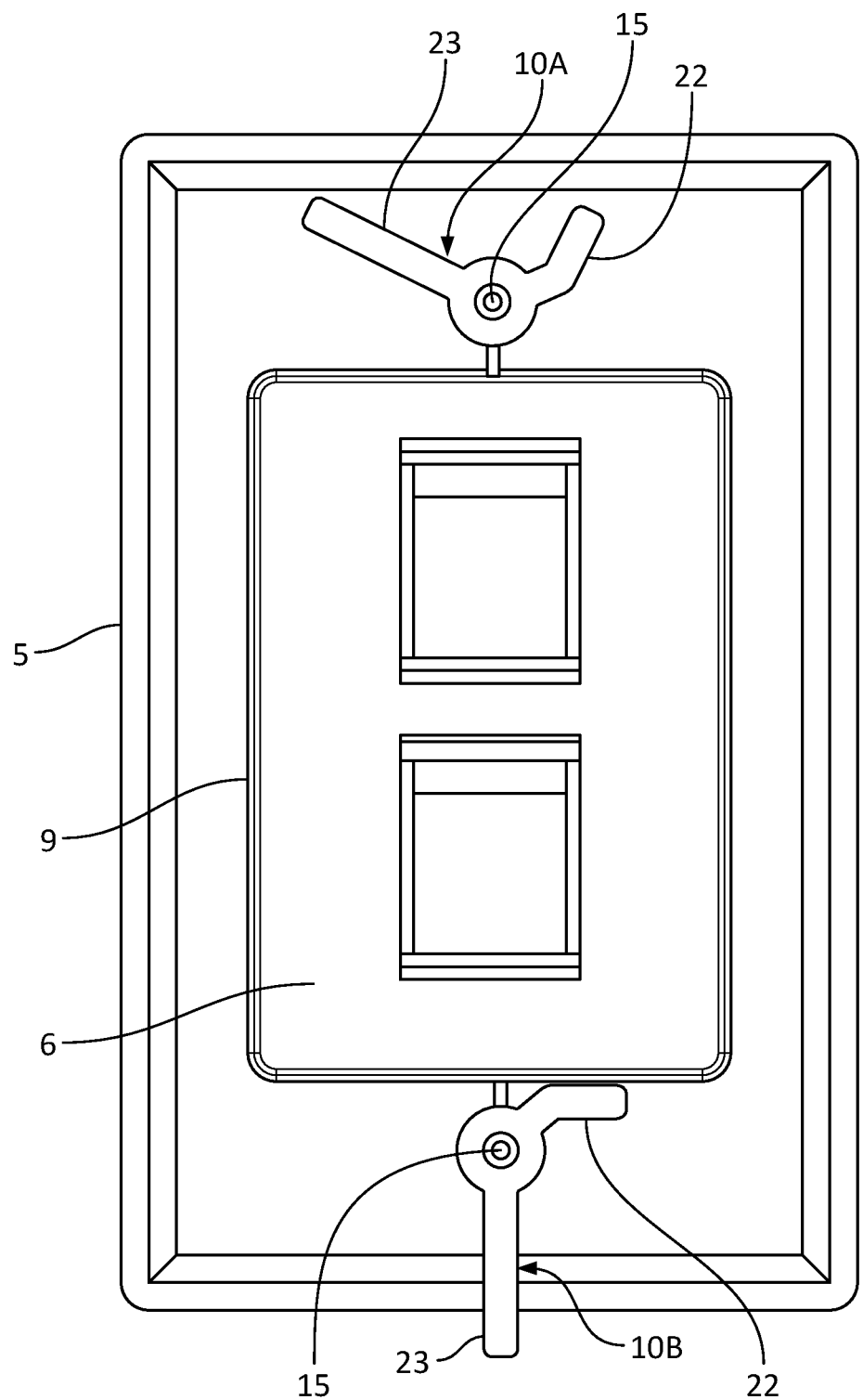
FIG. 2 shows a rear view of one embodiment of the electrical junction of FIG. 1, comprising three receptacles.
Figure 3A:
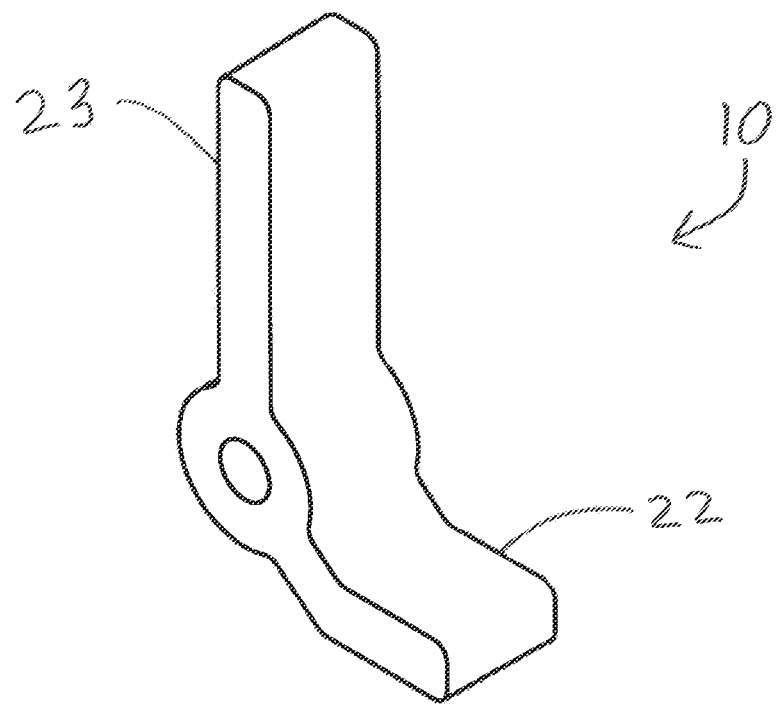
FIG. 3A shows a perspective view of a holding clip in the electrical junction of FIG. 1.
Figure 3B:
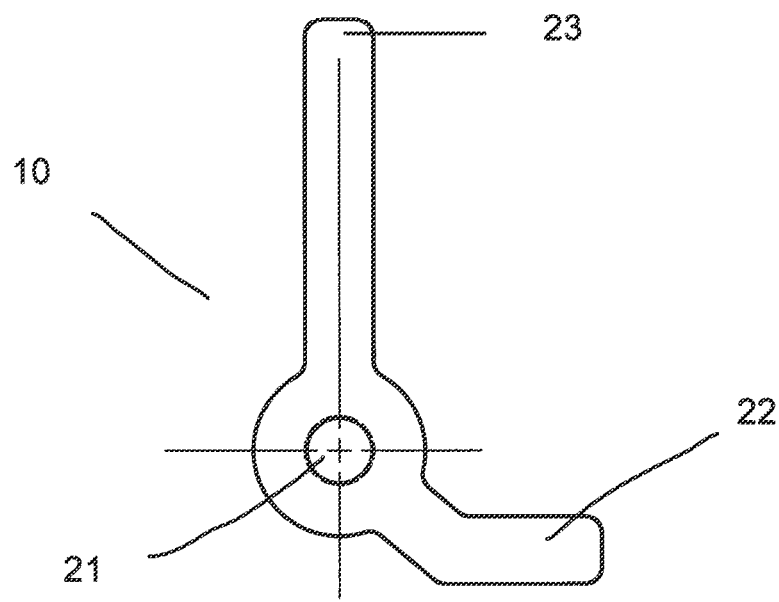
FIG. 3B shows a side view of the holding clip of FIG. 3A.

Referring to FIGS. 2, 3A, and 3B, one embodiment of receptacles 2, 3, 4 includes a mounting clip 10 implemented thereon. Mounting clip 10 helps connect, or fasten, electrical junction 1 to a wall. FIG. 2 shows a rear view of a receptacle 2, 3, 4, which shows two mounting clips 10 implemented thereon.

Mounting clips 10 are located on the back side of flange 5 and are operably connected to receptacle 2, 3, 4. In one embodiment, mounting clips 10 are rotatably operated by fasteners 15, and are rotatable with respect to the flange 5. Fasteners 15 are accessible through corresponding mounting holes 12 located on the front side of flange 5. Mounting clips 10 are rotatable with respect to flange 5 at the point of the fasteners 15. Mounting clips 10 may be rotated with a tool, such as a screw driver, that can be inserted through mounting holes 12.

Each mounting clip 10 comprises two arm members, 23 and 22. One arm member 22 engages with a side of recessed member 9 when the mounting clip 10 is rotated in that direction. On the other hand, arm member 22 disengages from recessed member 9 when it is rotated in the opposite direction.

Mounting clips 10 have two positions in the preferred embodiment. The first is an unlocked position, which is shown as 10A in FIG. 2. Or the second is a locked position, which is shown as 10B in FIG. 2. In electrical junction's 1 installed configuration, when electrical junction 1 is implemented in a wall, each mounting clip 10 can be rotated to its locked position 10B. One skilled in the art will appreciate that arm member 23 will be engageably positioned against the back side of the wall, whereby it will relatively firmly hold the respective receptacle 2, 3, 4, in electrical junction's 1 installed position with respect to the wall. This configuration will press flange 5 against the front surface of the wall, which will provide an aesthetically appealing look for electrical junction 1 with respect to the wall.

Similarly, the second mounting clip 10 can be rotated to a locked position 10B, which will provide a stronger overall hold for the receptacle 2, 3, 4 with respect to the wall, that, in turn, provides a more secure implementation for electrical junction 1 in the wall.

Each mounting clip 10 comprises a bend that is set off slightly from mounting clip's 10 axis of rotation 21, which is at fastener 15. The axis of rotation 21 is preferably where fastener 15 is attached to the mounting clip 10. The bend in mounting clip 10, sometimes referred to as a kick in the art, prevents further rotation of the mounting clip 10, whereby arm member 23 becomes substantially perpendicular relative to the receptacle's 2, 3, 4 top edge. This perpendicular alignment helps maximize the engagement of arm member 23 against the back side of the wall.

Mounting clip 10 is operably secured to flange 5 by fastener 15. Mounting clips 10 are placed in an unlocked position 10A prior to implementing electrical junction 1 in a wall. Initially, in unlocked position 10A, mounting clip's 10 arm member 23 does not extend past the perimeter of flange 5. On the other hand, in locked position 10B, mounting clips 10 engage with the wall's back side by extending past the perimeter of flange 5.

During implementation of electrical junction 1, an opening sized to accommodate electrical junction 1 is cut out in a wall. Electrical junction 1 is inserted into the opening in the wall, with the mounting clips 10 for each receptacle 2, 3, 4 in unlocked position 10A. The electrical junction 1 is inserted in the wall, each mounting clip 10 is rotated by turning fastener 15, roughly ninety degrees in one embodiment, to place them in locked position 10B. Flange 5 and arm member 23 of each mounting clip 10 clamp the wall, which secures the electrical junction 1 to the wall. As shown in FIG. 2, each mounting clip 10 is firmly stabilized in its position by a stop provided by arm member 22 as it engages with a side of recessed member 9. Further aspects of mounting clip's 10 construction and operation are provided in U.S. Pat. No. 9,865,971.

Mounting clips 10 help make the apparatus of electrical junction 1 self-supporting with respect to the wall. A separate support bracket is not needed. Further, electrical junction 1 can be expanded, or reduced, to comprise more or fewer receptacles 2, 3, 4, by resizing the hole in the wall. The existing work does not need to be torn out.

Rear surface 6 of each receptacle 2, 3, 4 is recessed from its corresponding flange 5. Flange 5 and rear surface 6 are parallel to each other, being mutually perpendicular to recessed member 9. However, rear surface 6 may be offset and recessed from flange 5 in other ways, such as by curved sides. Therefore, all such variations and embodiments are anticipated.

FIG. 4A shows a side view of center receptacle 3. FIG. 4B shows a plan view of center receptacle 3, FIG. 4C shows a cross-section of center receptacle 3, and FIG. 4D shows a perspective view of center receptacle 3. As discussed above, electrical junction 1 may have zero, one, or multiple center receptacles 3, whereby the actual number of center assemblies 3 will vary by embodiment. One skilled in the art will recognize that such feature will allow customizing a particular embodiment of electrical junction 1 in accordance with the specific requirements for that particular embodiment. The assembled electrical junction 1 for each embodiment will comprise flange 5, which runs around the periphery of electrical junction 1 in conjunction with other receptacles 2, 3, 4, each with mounting holes 12 to help mount the electrical junction 1 to the wall. Protruding members 7 and recesses 13 are also shown in alternating arrangement to cooperate when implemented with additional center receptacles 3 or with left receptacle 2 and right receptacle 4.

FIG. 5A shows a side view of left receptacle 2. FIG. 5B shows a plan view of left receptacle 2, FIG. 5C shows a cross-section of left receptacle 2, and FIG. 5D shows a perspective view of left receptacle 2. Left receptacle 2 also comprises a flange 5, recessed member 9, recessed surface 6, mounting holes 12, and sockets 8. Edge 32 has protruding members 7 and recesses 13 to engage with corresponding recesses 13 and protruding members 7 of an abutting center receptacle 3 or a right receptacle 4.

Figure 6C:
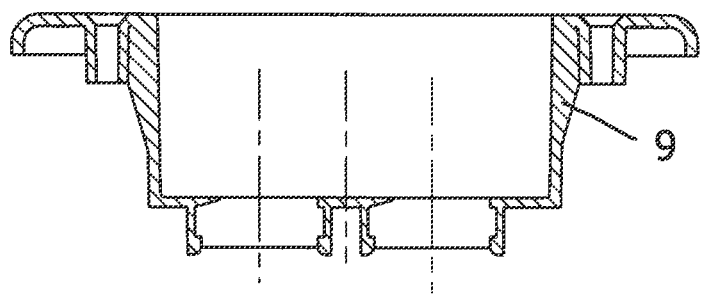
FIG. 6C shows a sectioned view of the right receptacle of FIG. 6A.
Figure 6D:
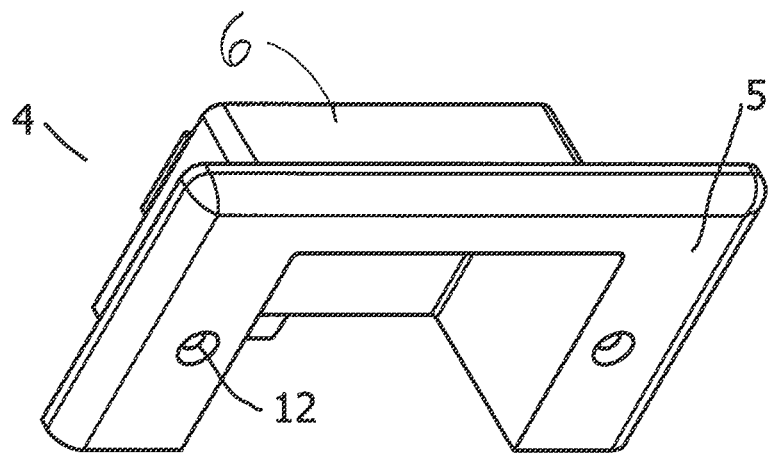
FIG. 6D shows a perspective view of the right receptacle of FIG. 6A.

FIG. 6A shows a side view of right receptacle 4. FIG. 6B shows a plan view of right receptacle 4, FIG. 6C shows a cross-section of right receptacle 4, and FIG. 6D shows a perspective view of right receptacle 4. Right receptacle 4 also comprises flanges 5, recessed member 9, recessed surface 6, mounting holes 12, and sockets 8. Edge 32 has protruding means 7 and recesses 13 to engage with the corresponding recesses 13 and protruding means 7 of an abutting center receptacle 3 or left receptacle 2.

Sockets 8 are shown in recessed surface 6 on each receptacle 2, 3, 4. Sockets 8 accommodate a keystone 25, preferably by snap fit using resiliently deformable rails 38 with retaining clip 35. In one embodiment, two sockets 8 are provided in a receptacle 2, 3, 4. However, it is anticipated that alternate embodiments of receptacle 2, 3, 4 may comprise more than two sockets 8, or only one socket 8. For example, an alternate embodiment may have a larger receptacle 2, 3, 4 that provides a greater sized recessed surface 6 on recessed member 9 in order to accommodate a greater number of sockets 8. The keystones 25 are selectively removable from the sockets 8, whereby the types of connection provided by a receptacle 2, 3, 4 can be customized, and modified at will.

A cutout in a wall is sized to accept electrical junction 1 with the particular number of receptacles 2, 3, 4 in that embodiment. As an example, to provide four separate electrical connections, only two receptacles 2, 4 are needed. Because they will provide a total of four sockets 8 with the two receptacles 2, 4. In one embodiment, receptacles 2, 3, 4 are implemented one at a time in the cutout in the wall, and are connected to each other at abutting edges 32 to form electrical junction 1 in-situ. Alternatively, electrical junction 1 is first constructed from the receptacles 2, 3, 4 and then the completed electrical junction 1 is inserted into the cutout in the wall. The interlocking of protruding members 7 with corresponding recesses 13 creates a resilient electrical junction 1 that can be securely implemented into the cutout in the wall.

Suitable keystones 25 can be selected and implemented into sockets 8 as desired. Electrical cabling running inside the wall can be connected to a plug in a socket 8 from the back of the keystone 25. A corresponding plug for that specific type of electrical connection can be implemented into the keystone 25, such as an RJ11 or RJ45 plug at a connection port 40 as shown in FIG. 8. Fasteners 15 can be operated to rotate the mounting clips 10, which is about ninety degrees in one embodiment, so that their arm members 22 engage recessed member 9 and their arm members 23 engages the back side of the wall. External cables can be plugged into the front of the keystones 25 in sockets 8, which are partially recessed in the wall, to establish desired connections between devices.

Figure 7A:
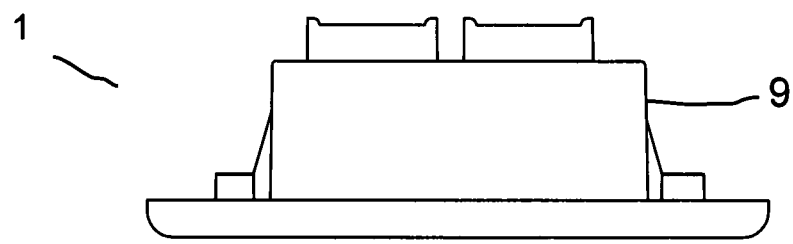
FIG. 7A shows a side view of a solo electrical junction.
Figure 7B:
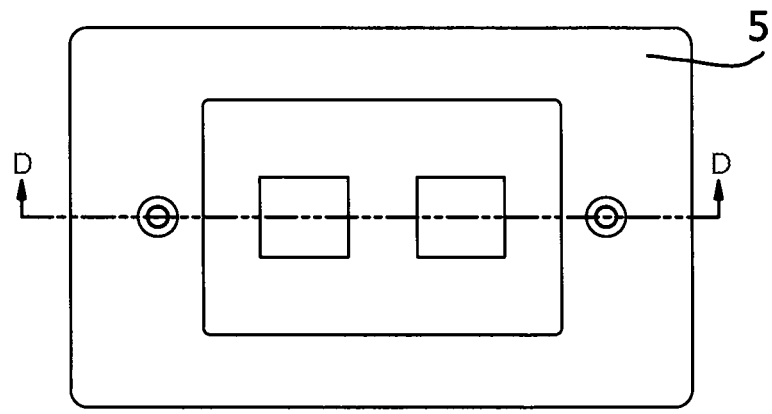
FIG. 7B shows a plan view of the solo electrical junction of FIG. 7A.
Figure 7C:
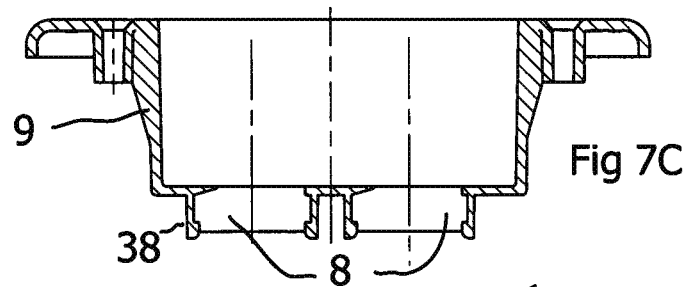
FIG. 7C shows a sectioned view of the solo electrical junction of FIG. 7A.
Figure 7D:
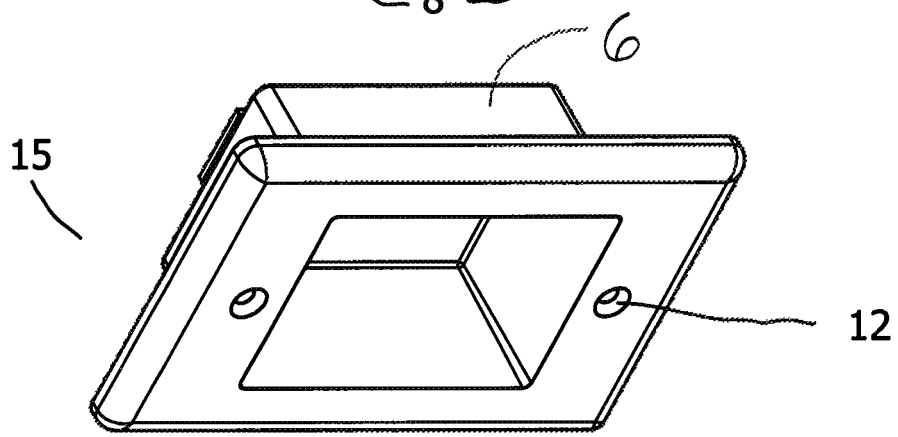
FIG. 7D shows a perspective view of the solo electrical junction of FIG. 7A.

It is anticipated that receptacles 2, 3, 4 may also be provided in a singular version, which is designed to be implemented by itself and not mate with another receptacle 2, 3, 4. FIG. 7 shows a singular version of receptacle 2, 3, 4. FIG. 7A shows a side view of a singular version of receptacle 2, 3, 4. FIG. 7B shows its plan view, FIG. 7C shows its cross-section, and FIG. 7D shows its perspective view. The singular receptacle essentially creates a singular electrical junction 1 with no additional receptacles 2, 3, 4, but which still utilizes the novel features and teachings of the present invention. Those skilled in the art will appreciate that the electrical junction 1 in this embodiment comprises flange 5, recessed surface 6, recessed member 9, mounting holes 12, and sockets 8. However, the electrical junction 1 in this embodiment will not be expandable.

The various parts of electrical junction 1 are preferably constructed from fire retardant materials, such as a fire retardant plastic. This feature contributes to achieving UL certification for electrical junction 1. Fire retardant materials for such construction are known in the art, and the material is Poly Carbonate or Acrylonitrile Butadiene Styrene in one embodiment.

Although the devices, systems, apparatus, and methods have been described and illustrated in connection with certain embodiments, variations and modifications will be evident to those skilled in the art. Such variations and modifications may be made without departing from the scope and spirit of the present disclosure, and are therefore anticipated. The description and teachings herein are thus not to be limited to the precise details of methodology or construction set forth herein because variations and modification are intended to be included in the scope of the present disclosures and teachings.

I claim:

1. An electrical junction, comprising:
   a first receptacle having:
      a first flange having a front side and a back side;
      a first recessed member connected to said first flange, said first recessed member having a first recessed surface; and
      at least one socket implemented in said first recessed surface, said socket comprising an opening configured to
      receive a first keystone;
      and
   a second receptacle having:
      a second flange having a front side and a back side;
      a second recessed member connected to said second flange, said second recessed member having a second recessed surface; and
      at least one socket implemented in said second recessed surface, said socket comprising an opening configured to receive a second keystone,
      wherein said first receptacle and said second receptacle each comprises interconnecting means configured to interconnect with each other to position said first receptacle and said second receptacle in abutment with each other, and said first flange is flush with said second flange when the first receptacle and the second receptacle are in abutment with each other.

2. The electrical junction of claim 1, wherein said first receptacle further comprises:
   a first mounting clip operatively attached to the back side of said first flange, wherein said first mounting clip comprises a first arm member and a second arm member; and
   a first rotating means operatively connected to said first mounting clip, said first rotating means operable to rotate said first mounting clip, wherein
      the front side of said first flange abuts against a front side of a wall, and
      said first rotating means is operable to engage said first mounting clip with a back side of said wall, wherein when said first rotating means is operated to rotate said first mounting clip, said first arm member engages said first recessed member and said second arm member engages with the back side of the wall.

3. The electrical junction of claim 2, further comprising a bend between the first arm member and the second arm member.

4. The electrical junction of claim 2, wherein said second receptacle further comprises:
- a second mounting clip operatively attached to the back side of said second flange;
- a second rotating means operatively connected to said second mounting clip, said second rotating means operable to rotate said second mounting clip, wherein the front side of said second flange abuts against the front side of the wall, and
- said second rotating means is operable to engage said second mounting clip with the back side of said wall.

5. The electrical junction of claim 2, further comprising:
- a mounting hole in the front side of said first flange, wherein said first rotating means
- is accessible and operable through said mounting hole.

6. The electrical junction of claim 1, further comprising two sockets implemented in said first recessed surface, each of said two sockets comprising an opening configured to:
- receive one of the first keystone, a second keystone, and a third keystone.

7. The electrical junction of claim 1, wherein said interconnecting means comprises:
- a protruding member on said first receptacle, and
- a recess in said second receptacle, whereby the protruding member and the recess cooperatively engage with each other.

8. The electrical junction of claim 4, wherein
- said second mounting clip comprises a third arm member and a fourth arm member wherein when said second rotating means is operated to rotate said second mounting clip, the third arm member engages the second recessed member; and the fourth arm member engages with the back side of the wall.

9. The electrical junction of claim 1, further comprising; two sockets implemented in said second recessed surface, each of said two sockets in said second recessed surface comprising an opening configured to:
- receive one of the first keystone, a second keystone, and a third keystone.

10. A method of implementing an electrical junction, comprising:
- cutting a hole in a wall, said wall having a front side and a back side;
- placing the electrical junction in the hole in the wall from the front side of the wall, wherein the electrical junction comprises:
  - a first receptacle having:
    - a first flange having a front side and a back side;
    - a first recessed member connected to said first flange, said first recessed member having a first recessed surface; and
    - at least one socket implemented in said first recessed surface, said socket comprising an opening configured to receive a first keystone; and
  - a second receptacle having:
    - a second flange having a front side and a back side;
    - a second recessed member connected to said second flange, said second recessed member having a second recessed surface; and
    - at least one socket implemented in said second recessed surface, said socket comprising an opening configured to receive a second keystone; and
- interconnecting said first receptacle and said second receptacle with interconnecting means, wherein said first receptacle and said second receptacle each comprises interconnecting means configured to interconnect with each other to position said first receptacle and said second receptacle in abutment with each other, and said first flange is flush with said second flange when the first receptacle and the second receptacle are in abutment with each other.

11. The method of claim 10, further comprising:
- engaging a first mounting clip with the back side of the wall, said first mounting clip is operatively attached to the back side of said first flange, wherein the first mounting clip comprises a first arm member and a second arm member; and
- rotating said first mounting clip with a first rotating means, said first rotating means operatively connected to said first mounting clip and operable to engage said first mounting clip with the back side of the wall, wherein the front side of said first flange abuts against the front side of the wall, wherein when said first rotating means is operated to rotate said first mounting clip, said first arm member engages said first recessed member and said second arm member engages with the back side of the wall, wherein said first arm member and said second arm member have a bend between them.

12. The method of claim 11, further comprising:
- engaging a second mounting clip with the back side of the wall, said second mounting clip operatively attached to the back side of said second flange; and
- rotating said second mounting clip with a second rotating means, said second rotating means operatively connected to said second mounting clip and the second rotating means is operable to rotate the second mounting clip, wherein the front side of said second flange abuts against the front side of the wall, and
- said second rotating means is operable to engage said second mounting clip with the back side of the wall.

13. The method of claim 12, wherein
- said first rotating means is accessible and operable through a mounting hole, wherein said mounting hole is in the front side of said first flange.

14. The method of claim 10, wherein two sockets are implemented in said first recessed surface, each of said two sockets comprising an opening configured to:
- receive one of the first keystone, a second keystone, and a third keystone.

15. The method of claim 10, wherein interconnecting said first receptacle and said second receptacle with the interconnecting means comprises:
- engaging a protruding member on said first receptacle with a recess in said second receptacle, whereby the protruding member and the recess cooperatively engage with each other.

16. The method of claim 12, wherein:
- said second mounting clip comprises a third arm member and a fourth arm member wherein when said second rotating means is operated to rotate said second mounting clip, the third arm member engages the second recessed member; and the fourth arm member engages with the back side of the wall.

* * * * *